United States Patent [19]

Saville et al.

[11] Patent Number: 5,228,785
[45] Date of Patent: Jul. 20, 1993

[54] STEPPED FOIL JOURNAL FOIL BEARING

[75] Inventors: Marshall P. Saville, Lawndale; Alston L. Gu, Rancho Palos Verdes, both of Calif.

[73] Assignee: AlliedSignal, Inc., Morris Township, Morris County, N.J.

[21] Appl. No.: 883,235

[22] Filed: May 7, 1992

Related U.S. Application Data

[63] Continuation-in-part of Ser. No. 631,604, Dec. 20, 1990, abandoned.

[51] Int. Cl.$^5$ .............................................. F16C 32/06
[52] U.S. Cl. ...................................... 384/103; 384/106
[58] Field of Search ................ 384/103, 104, 105, 106

[56] References Cited

U.S. PATENT DOCUMENTS

| | | | |
|---|---|---|---|
| 3,615,121 | 4/1969 | Barnett et al. | 384/103 |
| 3,893,733 | 7/1975 | Silver et al. | 384/106 |
| 4,153,315 | 5/1979 | Silver et al. | 384/106 |
| 4,178,046 | 12/1979 | Silver et al. | 384/103 |
| 4,195,395 | 4/1980 | Silver et al. | 29/898.02 |
| 4,229,054 | 10/1980 | Miller | 384/106 |
| 4,348,066 | 9/1982 | Agrawal et al. | 384/124 |
| 4,415,280 | 11/1983 | Angrawal | 384/103 |
| 4,451,163 | 5/1984 | Glaser | 384/106 |
| 4,475,824 | 10/1984 | Glaser et al. | 384/106 |
| 4,552,466 | 11/1985 | Warren | 384/106 X |
| 4,616,388 | 10/1986 | Soum et al. | 384/103 X |
| 4,818,123 | 4/1989 | Gu | 384/106 |
| 4,950,089 | 8/1990 | Jones | 384/103 |

FOREIGN PATENT DOCUMENTS 0375001 5/1989 European Pat. Off. .

Primary Examiner—Daniel P. Stodola
Assistant Examiner—William G. Battista, Jr.
Attorney, Agent, or Firm—Terry L. Miller; Joseph R. Black; Robert A. Walsh

[57] ABSTRACT

A journal bearing including a plurality of individual foils mounted to one of a pair of relatively rotatable members, and a plurality of undersprings which provide resilient support for the foils. The foils include a transition area defined for example by a step, adjacent the trailing edge of the preceding foil. The use of the stepped foil optimizes the geometry of the air gap profile, and thereby increases the load capacity of the journal foil bearing.

11 Claims, 4 Drawing Sheets

STEPPED FOIL JOURNAL FOIL BEARING

BACKGROUND OF THE INVENTION

This is a continuation-in-part application from application Ser. No. 07/631,604, filed Dec. 20, 1990, now abandoned.

Process fluid or gas bearings are utilized in a number of diverse applications. These fluid bearings generally comprise two relatively movable elements with a predetermined spacing therebetween filled with a fluid such as air, which, under dynamic conditions, form between converging relatively moving surfaces a supporting fluid pressure wedge sufficient to prevent contact between the two relatively movable elements.

Improved fluid bearings, particularly gas bearings of the hydrodynamic type, have been developed by providing foils in the space between the relatively movable bearing elements. Such foils, which are generally thin pliable, fine-dimension sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they introduce the requirement for an external source of clean fluid under pressure.

In order to properly position the compliant foils between the relatively movable bearing elements, a number of mounting means have been devised. In journal bearings, it is conventional practice to mount the individual foils in a slot or groove in one of the bearing elements as exemplified in U.S. Pat. No. 3,615,121.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

Those ordinarily skilled in the pertinent art will recognize that foil journal bearings having plural partially overlapped foils present a like plurality of wedge-shaped circumferentially-extending discontinuities in the radial spacing between the journal surface of the shaft and the confronting surfaces of the foils. That is, at the lapping of the foils, the radial spacing outward of the shaft journal surface increases necessarily by at least the radial thickness of the foils. In at least one respect this spacing discontinuity is an advantage because it provides an opening for axial entry of lubricating fluid into the bearing. On the other hand, the applicants have discovered that the circumferential extent of this spacing discontinuity is conventionally much greater than is needed, and decreases the load capacity of the bearing. Because the foil elements are already fine-dimension sheet material a decrease in the thickness of the foils is not a practicable solution to this problem, although it would somewhat decrease the circumferential length of the spacing discontinuity. This change would be one of degree rather than kind, and is contradictory to the necessity of providing a certain strength, and stiffness, in the pliant foil. The Applicants have invented a better way of decreasing the circumferential spacing discontinuity which also increases the load capacity of the bearing, apparently by providing an increased circumferential length in which the journal surface-to-foil spacing is small enough that the moving journal is effective in pumping fluid into the fluid pressure wedge. That is, both the magnitude and circumferential length of the fluid pressure wedge is increased by the present invention, with a resultant increase in bearing load capacity.

SUMMARY OF THE INVENTION

The present invention is directed to a high load capacity journal foil bearing and more particularly to a stepped foil arrangement. The journal foil bearing preferably includes a plurality of individual foils mounted to one of a pair of relatively rotatable members, and a plurality of undersprings which provide resilient support for the foils. The foils are formed from a relatively thin sheet of metallic foil, and extend circumferentially. In certain unidirectional rotation arrangements, it is desirable to have the trailing edge of the foil overlap the leading edge of the next successive foil. In order to minimize the air gap between the surface of the foil and the rotating element at the lapping of the foils where the foil defines a surface confronting the journal at a leading edge, the foils include a transition portion defined for example by a step, adjacent the trailing edge of the preceding foil. The use of the stepped foil optimizes the geometry of the air gap profile, and thereby increases the load capacity of the journal foil bearing. Alternative configurations for the transition portion for approximating the preferred air gap geometry are also detailed.

DESCRIPTION OF THE PREFERRED EMBODIMENTS

Figure 1:
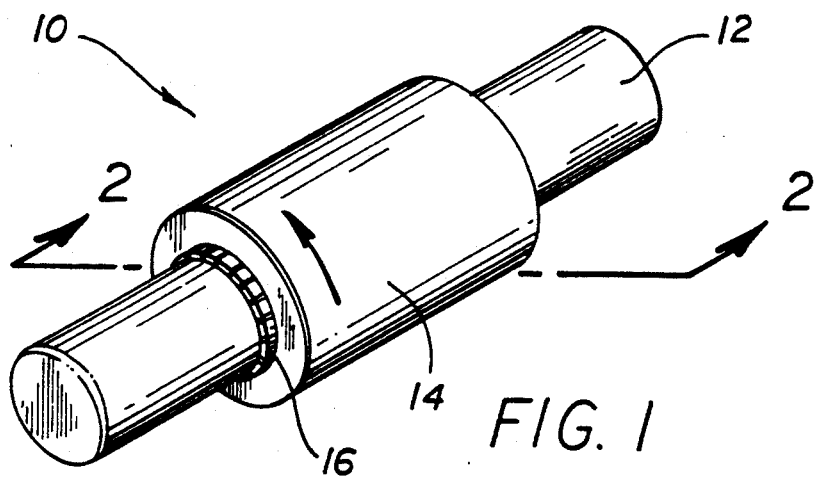
FIG. 1 is a perspective view of a foil journal bearing of the present invention.
Figure 2A:
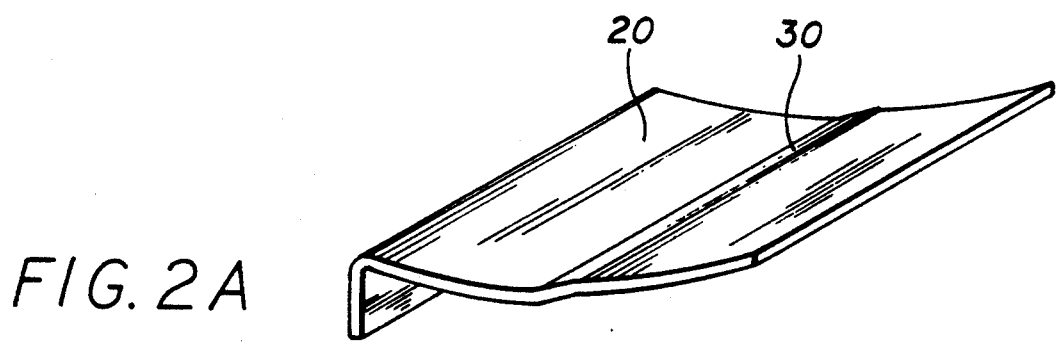
FIGS. 2A and 2B are perspective views of an individual foil and underspring of the present invention.
Figure 2B:
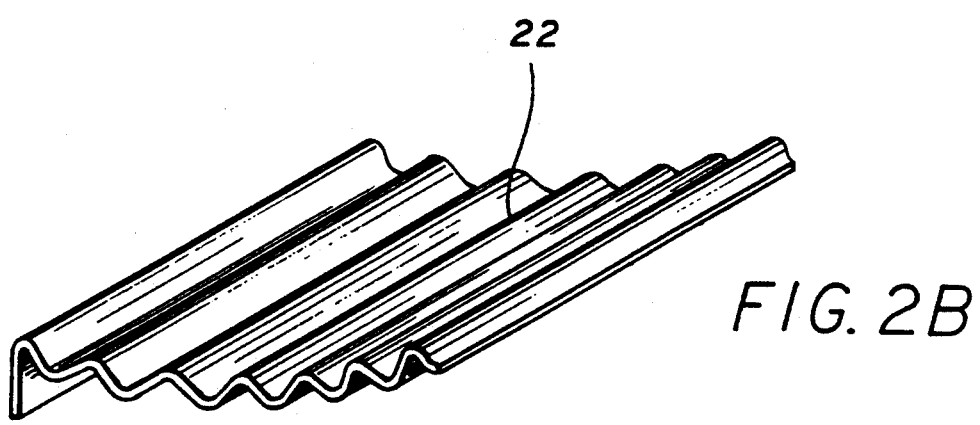

As generally illustrated in FIG. 1, The journal bearing 10 includes a shaft 12 rotatably supported within a bushing 14 by means of a foil bearing 16. The foil bearing 16, shown in FIG. 2, generally comprises a plurality of individual, overlapping compliant foils 20 (FIG. 2A) and a number of individual foil stiffener elements or undersprings 22 (FIG. 2B). Both the foils 20 and undersprings 22 are mounted in axial slots 24 in the bushing 14 in a conventional manner. The individual arcuate or curved foils 20, normally of a thin compliant metallic material, are illustrated as having a mounting means 26 at the leading edge thereof. The mounting means 26 may be formed integral with the individual foils 20 alternatively the foils 20 having may have a means 28 intermediate the ends as shown for example in FIG. 6.

The underspring 22, also normally of a thin compliant metallic material, generally has a predetermined circumferential curvature greater than the curvature of the individual foils 20. A preferred underspring 22 for use with the overlapping compliant foils 20 is detailed in copending U.S. application Ser. No. 07/631/591, also filed Dec. 20, 1990, entitled Foil Journal Bearing, herein incorporated by reference.

Figure 3:
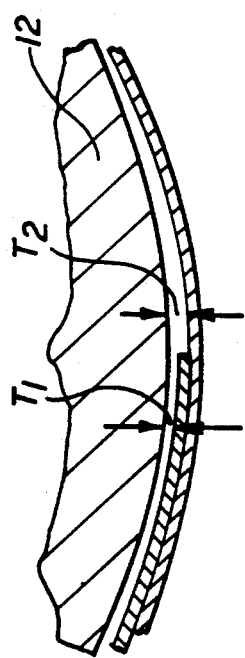
FIG. 3 is an exploded view of a portion of a prior art design.

The foil journal bearing 16 is designed to provide non-contacting bearing support for the rotating shaft 12 for shaft speeds in excess of a nominal, "lift off" speed. Essentially, air or another gaseous or liquified gas, is delivered to the journal bearing and acts as the working "fluid". Due to the relative rotation of the shaft 12 and bushing 14 boundary layers of the working fluid exits at the surfaces of the shaft 12 and foils 20, and the space therebetween is subjected to a pressure gradient. It is desirable to minimize the spacing between the surface of the foils 20 and the shaft 12 to maintain a high pressure gradient, while simultaneously maximizing the distribution of a uniform pressure on the surface of the foils 20. Previous foil journal bearing designs which incorporated a plurality of overlapping pads would have a transition area with a proportionally larger air gap, at least equal to the thickness of the preceding foil, in the area of the foil immediately downstream of the trailing edge of the preceding foil. This condition is illustrated in FIG. 3, wherein the air gap is depicted having a thickness of $T_1$ before the trailing edge of a foil and $T_2$ downstream of the trailing edge of the preceding foil.

Figure 4:
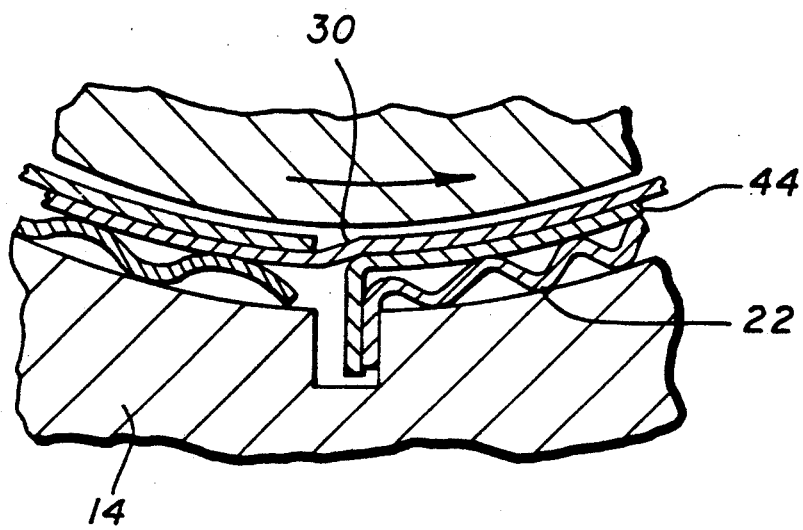
FIG. 4 is an exploded view showing the area enclosed by circle 4 in FIG. 2.

In order to minimize the air gap between the surface of the foil 20 and the rotating element at the leading edge of the foil 20,, the foils 20 of the present invention are is provided with a transition or step 30 adjacent the trailing edge of the preceding foil 20, as shown in FIG. 4. The use of the stepped foil 20 optimizes the geometry of the air gap profile, and thereby increases the load capacity of the journal foil bearing. The step 30 is preferably formed during the manufacture of the foils 20 by a stamping or forging step.

Figure 2:
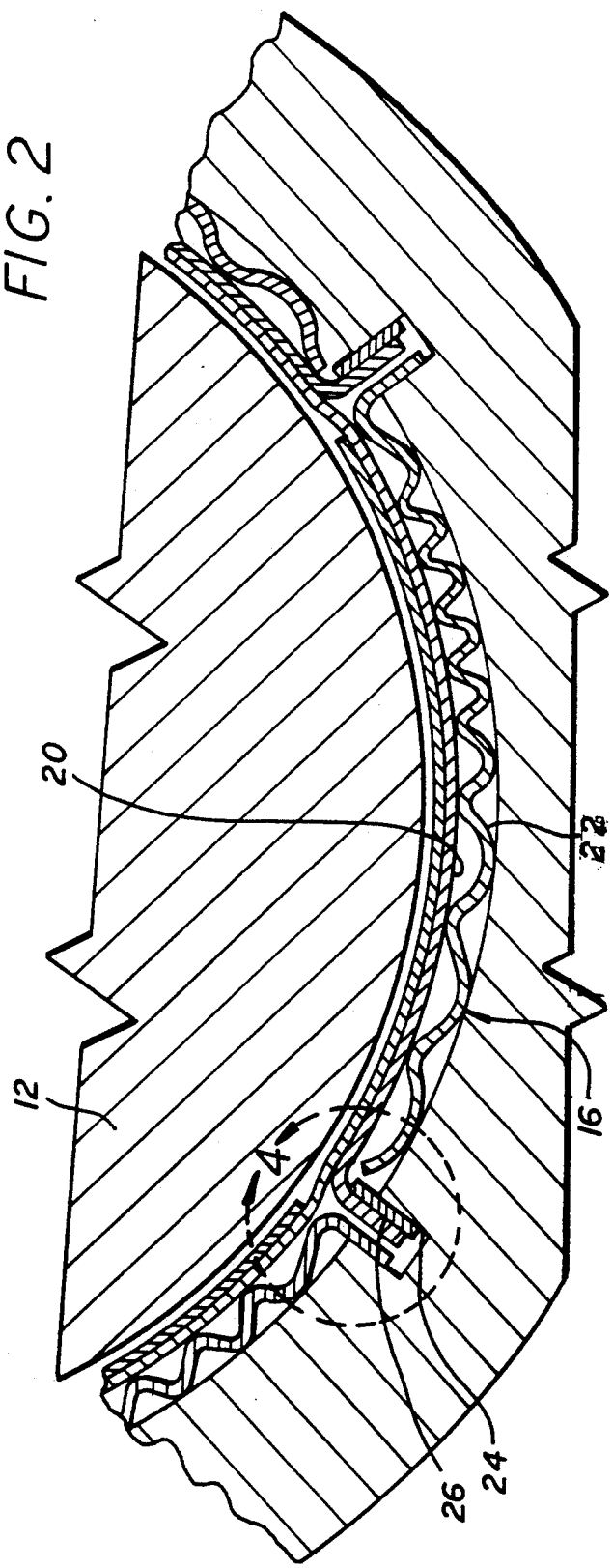
FIG. 2 is a partially cross sectional, partially perspective, view of the journal foil bearing in the assembly of FIG. 1.

Returning briefly to a consideration of FIG. 2 it will be seen that each foil 20 includes an overlapped arcuate portion 20' and an overlapping arcuate portion 20", which portions are connected by the transition or step portion 30, the arcuate curvature of the portions 20' and 20" is also discontinuous. In the depicted embodiment the transition portion 30 forms a radially and circumferentially extending discontinuity in arcuate curvature of the foil, and connects the two portions 20' and 20" which are at differing radial distances from the shaft 12.

Both the step portion 30 and overlapping portion 20" confront and define a radial spacing with the surface of the shaft 12 in operation of the bearing 10. Preferably, the step portion 30 has a circumferential dimension which is in the range of from about 5% or less to about 15% or more of the circumferential dimension of portions 20". Although the drawing of FIG. 2 is not to scale, it depicts a ratio of circumferential dimensions for step 30 to the circumferential dimension of the surface of foil 20 confronting shaft 12 (i.e., portion 20") of about 20:1. The circumferential spacing discontinuity which does remain in the bearing 10 with steps 30 in the foils 20 (i.e., in the range from about 5% to about 15% of foil circumferential surface confronting the shaft) provides adequate entrance of lubricating and cooling fluid axially into the bearing.

Figure 5:
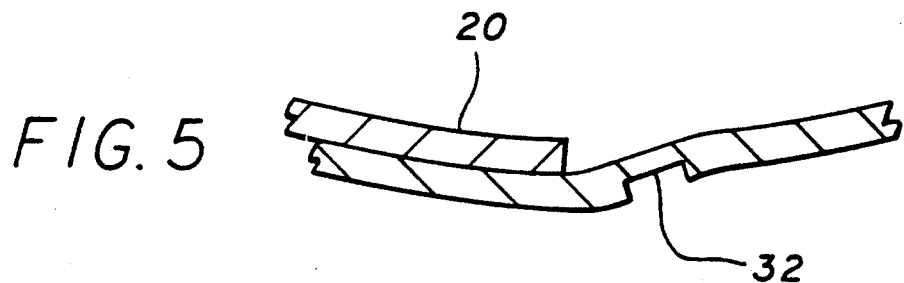
FIG. 5 is an exploded view showing an alternate configuration for the foil of FIG. 4.

FIG. 5 illustrates an alternative method of providing the transition in the foils 20, wherein a radially outwardly opening groove 32 is formed along the underside (i.e. on the radially outer surface) of the foil 20. The groove 32 provides a structurally weak area which will deform under operating pressure. The groove 30 is preferably formed by either a mechanical or chemical machining process during fabrication of the foil 20.

Figure 6:
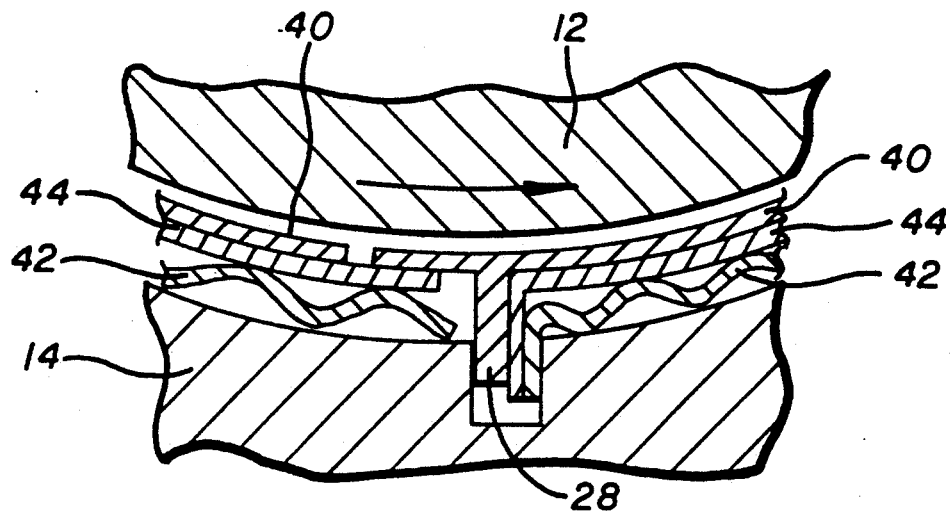
FIG. 6 is an exploded view showing a second alternate configuration for the foil of FIG. 4.

A second alternative construction for a foil bearing 36 including two-part foils (40, 44) and undersprings 42 is depicted in FIG. 6. Structures analogous in structure or function to those described above are referenced with the same numeral used previously with a prime added thereto if necessary for clarity. For this embodiment, the foil portions 40 which define the foil bearing surface portion 20' confronting the shaft 12 do not overlap one another. Instead, the trailing edge of a preceding foil portion 40 is closely spaced with respect to the leading edge of a subsequent foil portion 40. By providing adequate spring force to the underside of the foils 40, a very small air gap can be maintained at the foils leading edge. The leading edge of the foils 40 extends forward of the mounting means 28. In this case, the spring force is applied by overlapping the leading edge of the foils 40 atop the trailing edge of the preceding underspring 42. Because it is desirable to have thin, compliant foil portions 40 proximate the rotating shaft 12, it is also desirable to have relatively stiffer spacer foil portions 44 inserted between the radially outer surfaces of the foil portions 40 and the undersprings 42, as is shown in FIG. 6. The spacer foil portions 44 distribute the forces exerted by the undersprings 42 to prevent excessive localized deformation of the overlying foil portions 40, and increase the damping force of the journal bearing 16 due to the addition of frictional forces between the foil portions 40 and spacer foil portions 44. The spacer foil portions 44 also are overlapped both by a foil portion 40 and by a foil portion next adjacent in the direction of shaft rotation. That is, the spacer foil 44 is overlapped by the trailing part of a foil portion 40 and by the leading part of a next-following foil portion considering the direction of shaft rotation. Thus, the foil portions 40 and 44 cooperate to define a transition surface portion 30' whereat the foil portion 44 confronts the shaft 12. On each side of the transition portion 30', the foil portions 40 confront the shaft 12. As with the embodiments of FIGS. 1, 2, 4 and 5, the embodiment of FIG. 6 is believed to offer best bearing capacity when circumferential gap between the foil portions 40 (where foil portion 44 confronts shaft 12) is about 5% to about 15% of the circumferential length of the foil portion 40.

In the embodiment of FIG. 6 the transition 30' is defined by a radially and circumferentially extending discontinuity in the radial thickness of the two-part foil including portions 40 and 44. That is, ahead of the transition portion 30' the foil thickness is defined by portions 40 and 44 together, while at the transition 30', the foil thickness is defined only by portion 44. Behind the transition portion 30', the portion 44 is overlapped by the leading edge of the next foil portion 40, of the next two-part foil 40, 44.

Figure 7:
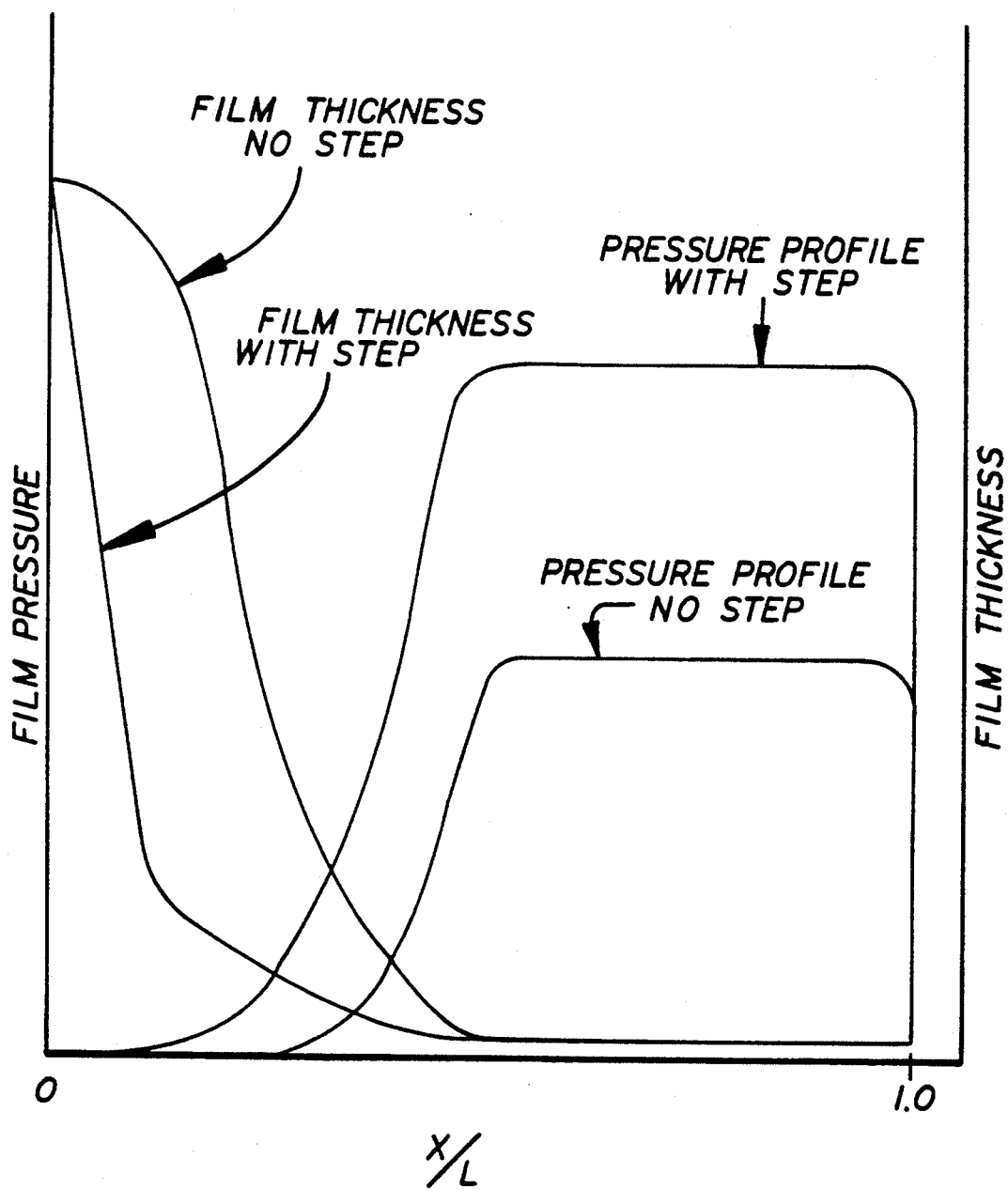
FIG. 7 is depicts the pressure on two different foil bearings as a function of circumferential length.

FIG. 7 illustrates the increase in load capacity of the journal bearing 10 including the step 30 as depicted in FIGS. 1, 2, and 4-6. The circumferential distribution of fluid pressure on the surface of a single foil is depicted for a journal bearing which includes the steps 30 (solid line), and for a bearing without the steps (dashed lined). As may be appreciated, the pressure profile on the foils increases more rapidly for the stepped foil 20. In addition, the total area under the fluid pressure curve is greater for the stepped foil 20, so that the load capacity of the journal bearing 10 is increased proportionately.

For each of the designs according to FIGS. 1, 2, and 4-6, the foils 20, 40, 44 are preferably a thin metallic foil such as nickel alloy having a thickness in the range of between 0.0025 cm to 0.05 cm, preferably about 0.01 to 0.02 cm for a 4.5 cm diameter shaft 12. The transition step 30 in each case is designed to define an air gap immediately downstream of the transition having a thickness in the range of between approximately equal to and fifty times the thickness of the spacing at the trailing edge of the preceding foil. In the case steps 30 of FIG. 4, the step height will be equal to or less than the thickness of the foils 20, thus the steps 30 will have a height in the range of between 0.0025 cm and 0.05 cm. For the groove 32 of FIG. 5, the dimensions of the groove will be defined by the thickness of the foil 20, and the material characteristics. In general, the grooves 32 will have a depth approximately one-half the thickness of the foils 20, and a width of between one-half and three times the thickness of the foils 20. The undersprings 22, 42 as well as the spacer foil portions 44 are also formed from thin metallic sheets such as nickel alloy or stainless steel having thickness in the range of between 0.0025 cm and 0.075 cm. It should be noted that the thicknesses of the undersprings and spacer foil portions are generally greater than the thickness of the foils 20, 40, preferably from twenty to one hundred percent greater.

It should be evident from the foregoing description that the present invention provides advantages over foil journal bearings of the prior art. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. A foil bearing foil element: said foil element being of fine-dimension pliable sheet material and having a thickness, an axial width, and a circumferential length; said foil element being generally arcuate in the circumferential direction and including an overlappable portion and an adjacent portion adapted to overlap a like foil element; said adjacent and overlappable portions being of like circumferential extent and differing arcuate radius; said foil element further including a step-like transition portion connecting said overlappable and adjacent portions and being of from 5% to 15% of the circumferential extent of the latter.

2. The foil element of claim 1 wherein the overlappable and adjacent portions have a common axial width.

3. A journal foil bearing comprising:
a bushing member;
a shaft member arranged for unidirectional relative rotation within said bushing member;
a compliant foil assembly disposed between said shaft and bushing members, said foil assembly including a plurality of circumferentially evenly arrayed and overlapping like arcuate foil elements mounted to said bushing member, each foil element being of fine-dimension sheet material having a thickness and extending with a uniform axial width circumferentially between said shaft and bushing members, each foil element defining a surface portion having a circumferential dimension and confronting said shaft and in operation of said bearing defining an operating clearance therewith, and also including an overlapping portion and an overlapped portion respectively overlapping and overlapped by next adjacent foil elements of said plurality of foil elements, and a transition portion connecting said overlapped and overlapping portions;
each foil element at said transition portion thereof defining a step-like discontinuity so that said transition portion connects overlapped and overlapping portions of said foil element and has a circumferential dimension which is from 5% to 15% inclusive of the circumferential dimension of said surface portion;
wherein said discontinuity is one of arcuate curvature, said transition portion having a radial dimension substantially equal to said thickness; and wherein each of the foil elements has a uniform axial width over its entire circumferential length.

4. The foil bearing of claim 3 wherein said transition portion has a radial dimension of from 0.0025 cm to and including and 0.05 cm.

5. The foil bearing of claim 3 wherein said overlapping portion and said overlapped portion have a differing arcuate radius according to the radial dimension of said transition portion.

6. The foil bearing of claim 3 wherein said transition surface is converging with said shaft in the direction of shaft rotation between said overlapped and said overlapping foil portions.

7. A journal foil bearing comprising:
a bushing member;
a shaft member arranged for unidirectional relative rotation within said bushing member;
a compliant foil assembly disposed between said shaft and bushing members, said foil assembly including a plurality of circumferentially evenly arrayed and overlapping like arcuate foil elements mounted to said bushing member, each foil element being of fine-dimension sheet material having a thickness and extending with a uniform axial width circumferentially between said shaft and bushing members, each foil element defining a surface portion confronting said shaft and in operation of said bearing defining an operating clearance therewith, and also including an overlapping portion and an overlapped portion respectively overlapping and overlapped by next adjacent foil elements of said plurality of foil elements, and a transition portion connecting said overlapped and overlapping portions;

each foil element at said transition portion thereof defining a step-like discontinuity so that said transition portion connects overlapped and overlapping portions of said foil element and presents to said shaft a transition surface which is from 5% to 15% inclusive of the circumferential dimension of said surface portion;

wherein said discontinuity is one of foil thickness, said foil elements each defining an axial groove opening radially outwardly on said transition portion, whereby said groove provides a structurally weakened zone of increased pliability connecting said overlapped and overlapping portions.

8. The foil bearing of claim 7 wherein said axial groove has a radial depth of about one-half said thickness and a circumferential width of from one-half to three times said thickness.

9. A journal foil bearing comprising:
a bushing member;
a shaft member arranged for unidirectional relative rotation within said bushing member;
a compliant foil assembly disposed between said shaft and bushing members, said foil assembly including a plurality of circumferentially evenly arrayed like arcuate foil elements mounted to said bushing member, each foil element being of fine-dimension sheet material having a thickness and extending with a uniform axial width circumferentially between said shaft and bushing members, each foil element defining a surface portion confronting said shaft and in operation of said bearing defining an operating clearance therewith, and also including an overlapping portion and an overlapped portion respectively overlapping and overlapped by next adjacent foil elements of said plurality of foil elements, and a transition portion connecting said overlapped and overlapping portions;

each foil element at said transition portion thereof defining a step-like discontinuity so that said transition portion extends between overlapped and overlapping portions of said foil and presents to said shaft a transition surface which is from 5% to 15% inclusive of the circumferential dimension of said surface portion;

wherein said discontinuity is one of foil thickness, said foil elements being of two-part construction with cooperating radially inner compliant portions and radially outer and stiffer spacer portions, said radially inner portion of each foil element having a circumferential extent in the direction of shaft rotation which is less than the circumferential extent of its respective spacer portion, said radially inner portion terminating in an edge defining a leading edge of said transition portion, and said spacer portion defining a radially inwardly disposed surface which defines said transition surface beyond said terminating edge of said radially inner portion.

10. The foil bearing of claim 9 wherein each foil element radially inner portion also includes a leading edge overlapping with the spacer portion of the preceding foil, each foil radially inner portion leading edge defining the trailing edge of said transition surface of the preceding foil element.

11. The foil bearing of claim 9 wherein said radially inner compliant portion and said radially outer spacer portion each have respective thickness dimensions, these thickness dimensions being related by a ratio in the range of from 1.2:1 to 2:1.

* * * * *